US012513515B2

(12) United States Patent
McTiernan et al.

(10) Patent No.: US 12,513,515 B2
(45) Date of Patent: Dec. 30, 2025

(54) IDENTITY RESOLUTION OF A USER EQUIPMENT (UE) CONNECTABLE TO A FIFTH GENERATION (5G) MOBILE NETWORK

(71) Applicants: Kevin McTiernan, Milpitas, CA (US); Cemal Dikmen, Milpitas, CA (US)

(72) Inventors: Kevin McTiernan, Milpitas, CA (US); Cemal Dikmen, Milpitas, CA (US)

( * ) Notice: Subject to any disclaimer, the term of this patent is extended or adjusted under 35 U.S.C. 154(b) by 730 days.

(21) Appl. No.: 17/882,699

(22) Filed: Aug. 8, 2022

(65) Prior Publication Data
US 2024/0048978 A1 Feb. 8, 2024

(51) Int. Cl.
*H04W 12/06* (2021.01)
*H04W 12/02* (2009.01)
*H04W 60/00* (2009.01)

(52) U.S. Cl.
CPC .......... *H04W 12/06* (2013.01); *H04W 12/02* (2013.01); *H04W 60/00* (2013.01)

(58) Field of Classification Search
CPC ..... H04W 12/06; H04W 12/02; H04W 60/00; H04W 12/72
See application file for complete search history.

(56) References Cited

U.S. PATENT DOCUMENTS

| 9,445,443 B2 | 9/2016 | Horn et al. |
| 10,171,993 B2 | 1/2019 | Nair et al. |
| 10,425,817 B2 | 9/2019 | Torvinen et al. |
| 11,265,699 B2 | 3/2022 | Targali |
| 11,272,365 B2 | 3/2022 | Lei et al. |
| 11,368,639 B2 | 6/2022 | Targali |
| 11,528,599 B2 * | 12/2022 | Baskaran .............. H04W 12/06 |
| 2015/0029886 A1 * | 1/2015 | Seo ..................... H04L 27/2602 370/252 |
| 2017/0070880 A1 | 3/2017 | Hahn et al. |

(Continued)

FOREIGN PATENT DOCUMENTS

| CN | 111741467 A | 10/2020 |
| CN | 115038078 A | 9/2022 |

(Continued)

*Primary Examiner* — Santiago Garcia
(74) *Attorney, Agent, or Firm* — Legalforce RAPC Worldwide

(57) ABSTRACT

A method includes implementing, through a server of a Fifth Generation (5G) mobile network, a pseudo-Authentication Server Function (AUSF) component as a component of an architecture of a core mobile network of the 5G mobile network distinct from an existing AUSF module thereof executing on the server, and automatically routing a request for identity resolution of a User Equipment (UE) connectable to the 5G mobile network to the pseudo-AUSF component instead of the existing AUSF module, with the request including a concealed identifier of the UE. The method also includes automatically resolving the concealed identifier into a permanent identifier of the UE utilizing an existing Unified Data Management (UDM) module of the core mobile network based on communication between the pseudo-AUSF component and the existing UDM module, and automatically providing, through the existing UDM module and the pseudo-AUSF component, the permanent identifier of the UE to address the request.

20 Claims, 7 Drawing Sheets

(56) References Cited

U.S. PATENT DOCUMENTS

| | | | |
|---|---|---|---|
| 2018/0324585 A1* | 11/2018 | Nair | H04W 12/069 |
| 2018/0331830 A1* | 11/2018 | Jerichow | H04W 12/35 |
| 2019/0036697 A1* | 1/2019 | Jerichow | H04L 9/3226 |
| 2019/0208507 A1* | 7/2019 | Xiong | H04L 69/324 |
| 2019/0394640 A1 | 12/2019 | Lee et al. | |
| 2020/0068391 A1 | 2/2020 | Liu et al. | |
| 2021/0058776 A1 | 2/2021 | Nair et al. | |
| 2021/0204118 A1* | 7/2021 | Jost | H04L 9/0827 |
| 2021/0337380 A1 | 10/2021 | Ianev et al. | |
| 2021/0368345 A1* | 11/2021 | Nakarmi | H04L 9/0825 |
| 2022/0103540 A1 | 3/2022 | Prasad et al. | |
| 2022/0104009 A1 | 3/2022 | Baskaran et al. | |
| 2022/0124079 A1 | 4/2022 | Patil et al. | |
| 2022/0159460 A1 | 5/2022 | Ben Henda et al. | |
| 2022/0240085 A1 | 7/2022 | Long | |
| 2022/0272530 A1 | 8/2022 | Nair et al. | |
| 2022/0272534 A1* | 8/2022 | Torvinen | H04L 9/088 |
| 2022/0351469 A1* | 11/2022 | Pan | G06T 19/006 |
| 2022/0360982 A1* | 11/2022 | Tsiatsis | H04W 12/0433 |
| 2022/0361144 A1* | 11/2022 | He | H04W 72/23 |
| 2023/0319696 A1* | 10/2023 | Kuge | H04W 48/06 |
| 2023/0370218 A1* | 11/2023 | Zhang | H04L 5/0091 |
| 2023/0422032 A1* | 12/2023 | Liu | H04W 12/06 |
| 2024/0179525 A1* | 5/2024 | Li | H04W 12/73 |
| 2024/0236670 A1* | 7/2024 | Allan | H04W 12/08 |
| 2024/0284174 A1* | 8/2024 | Li | H04W 12/72 |
| 2024/0430839 A1* | 12/2024 | Kuge | H04W 48/18 |
| 2025/0056461 A1* | 2/2025 | Sugawara | H04W 8/183 |
| 2025/0185089 A1* | 6/2025 | Izumi | H04W 60/00 |
| 2025/0261268 A1* | 8/2025 | Sugawara | H04W 76/19 |
| 2025/0267760 A1* | 8/2025 | Izumi | H04W 12/082 |

FOREIGN PATENT DOCUMENTS

| | | |
|---|---|---|
| EP | 3713274 A1 | 9/2020 |
| EP | 4047969 A1 | 8/2022 |
| TW | 202224394 A | 6/2022 |
| WO | 2020024764 A1 | 2/2020 |
| WO | 2021015199 A1 | 1/2021 |
| WO | 2021104630 A1 | 6/2021 |
| WO | 2021138165 A1 | 7/2021 |
| WO | 2021259452 A1 | 12/2021 |
| WO | 2022062517 A1 | 3/2022 |

* cited by examiner

IDENTITY RESOLUTION OF A USER EQUIPMENT (UE) CONNECTABLE TO A FIFTH GENERATION (5G) MOBILE NETWORK

FIELD OF TECHNOLOGY

This disclosure relates generally to Fifth Generation (5G) mobile networks and, more particularly, to a system, a server and/or a method of identity resolution of a User Equipment (UE) connectable to a 5G mobile network.

BACKGROUND

A prerequisite for a User Equipment (UE) (e.g., a mobile device, a computing device, a remote-controlled device, a smart vehicle) to connect to a network of a Mobile Network Operator (MNO) may be for the UE to self-identify to the network. An identifier used for the aforementioned self-identification may then be utilized to confirm a user associated with the UE as a valid subscriber with a home network associated with the MNO. In previous generations of mobile networks, a UE may provide a permanent identifier (e.g., International Mobile Subscriber Identity (IMSI)) in an unencrypted form during the self-identification thereof.

However, criminals, foreign adversaries and/or oppressive regimes may leverage the permanent identifiers of UEs for nefarious uses. For this reason, issues of privacy and security took center-stage with regard to Fifth Generation (5G) mobile networks. In 5G mobile networks, the identification of an UE itself has been changed. When the UE is requested to self-identify to a 5G mobile network, a public encryption key of a home network of the UE may be used to encrypt the permanent identifier (e.g., Subscription Permanent Identifier (SUPI)) thereof and create a concealed identifier (e.g., Subscription Concealed Identifier (SUCI)). The aforementioned concealment of the permanent identifier of the UE may involve encryption thereof each time the UE self-identifies. Therefore, the UE may never appear the same way twice. Further, the ever-changing concealed identifier may prevent correlation of signal strength (or, return time) readings to the UE and application of techniques such as trilateration thereto.

SUMMARY

Disclosed are a system, a server and/or a method of identity resolution of a User Equipment (UE) connectable to a Fifth Generation (5G) mobile network.

In one aspect, a method includes implementing, through one or more server(s) of a 5G mobile network including one or more processor(s) communicatively coupled to one or more memories, a pseudo-Authentication Server Function (AUSF) component as a component of an architecture of a core mobile network of the 5G mobile network distinct from an existing core functionality of the core mobile network implemented through an existing AUSF module thereof executing on the one or more server(s). The pseudo-AUSF component is implemented with a narrow subset of functionalities associated with the existing AUSF module. The method also includes automatically routing, through the one or more server(s), a request for identity resolution of a UE connectable to the 5G mobile network from an authorized data processing device to the pseudo-AUSF component instead of the existing AUSF module, with the request including a concealed identifier of the UE.

Further, the method includes automatically resolving, through the one or more server(s), the concealed identifier into a permanent identifier of the UE utilizing an existing Unified Data Management (UDM) module of the core mobile network executing on the one or more server(s) based on communication between the pseudo-AUSF component and the existing UDM module, and automatically providing, through the existing UDM module and the pseudo-AUSF component executing on the one or more server(s), the permanent identifier of the UE to the authorized data processing device to address the request.

In another aspect, a server includes a memory including a pseudo-AUSF component stored therein implemented with a narrow subset of functionalities associated with an existing AUSF module of a core mobile network of a 5G mobile network executing on the server, and a processor communicatively coupled to the memory. The processor executes instructions to implement the pseudo-AUSF component as a component of an architecture of the core mobile network distinct from an existing core functionality of the core mobile network implemented through the existing AUSF module, and automatically route a request for identity resolution of a UE connectable to the 5G mobile network from an authorized data processing device to the pseudo-AUSF component instead of the existing AUSF module, with the request including a concealed identifier of the UE.

The processor also executes instructions to automatically resolve the concealed identifier into a permanent identifier of the UE utilizing an existing UDM module of the core mobile network executing on the server based on communication between the pseudo-AUSF component and the existing UDM module, and automatically provide, through the existing UDM module and the pseudo-AUSF component, the permanent identifier of the UE to the authorized data processing device to address the request.

In yet another aspect, a system includes an authorized data processing device originating a request for identity resolution of a UE connectable to a 5G mobile network, with the request including a concealed identifier of the UE, and one or more server(s) including one or more processor(s) communicatively coupled to one or more memories implementing a pseudo-AUSF component as a component of an architecture of a core mobile network of the 5G mobile network distinct from an existing core functionality of the core mobile network implemented through an existing AUSF module thereof executing on the one or more server(s). The pseudo-AUSF component is implemented with a narrow subset of functionalities associated with the existing AUSF module.

The one or more server(s) automatically routes the request from the authorized data processing device to the pseudo-AUSF component instead of the existing AUSF module, automatically resolves the concealed identifier into a permanent identifier of the UE utilizing an existing UDM module of the core mobile network executing on the one or more server(s) based on communication between the pseudo-AUSF component and the existing UDM module, and automatically provides, through the existing UDM module and the pseudo-AUSF component, the permanent identifier of the UE to the authorized data processing device to address the request.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a system, a server and/or a method of identity resolution of a User Equipment (UE) connectable to a 5G mobile network. Although the present embodiments have been described with reference to specific example embodiments, it will be evident that various modifications and changes may be made to these embodiments without departing from the broader spirit and scope of the various embodiments.

Figure 1:
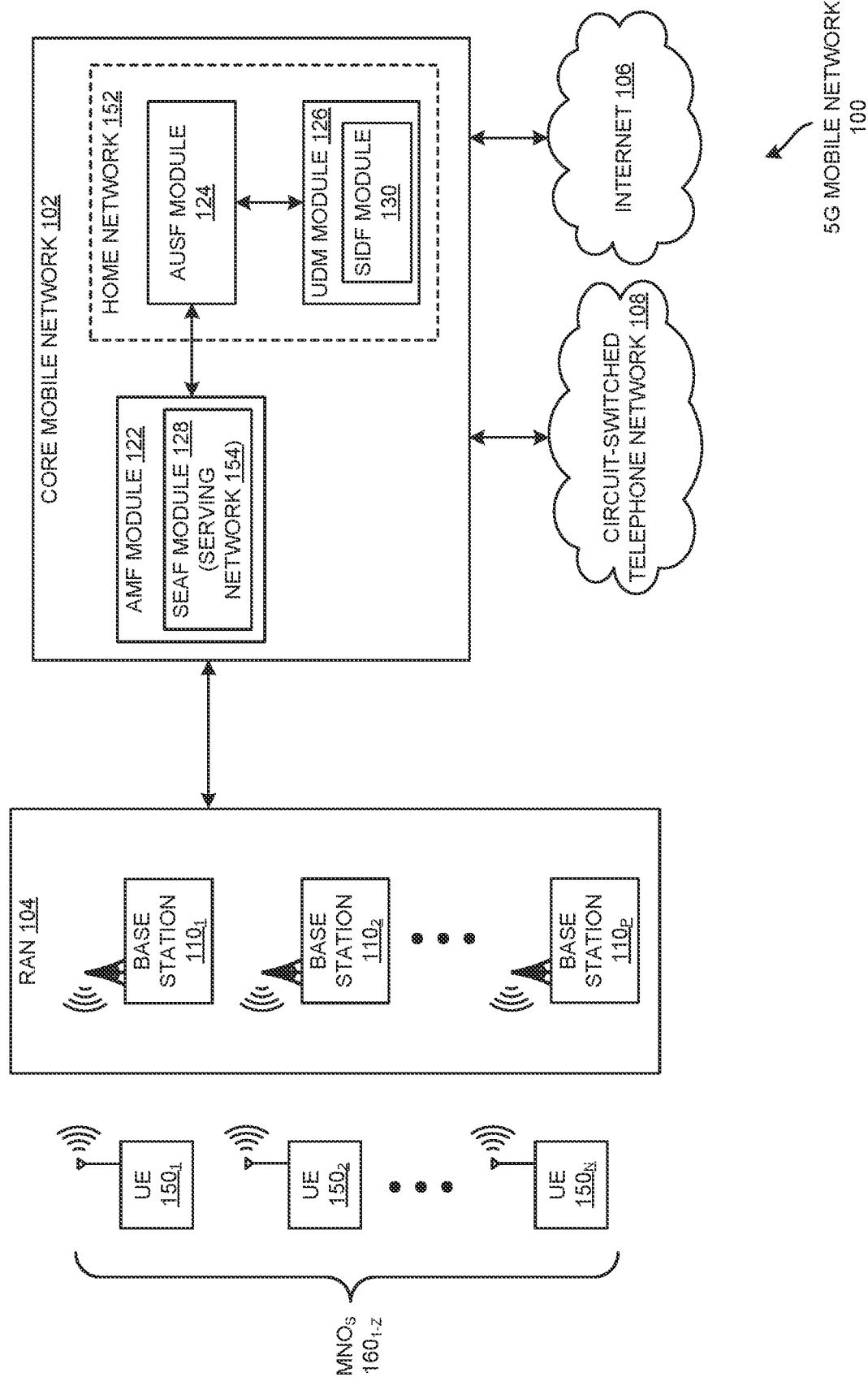
FIG. 1 is a schematic view of an architecture of a Fifth Generation (5G) mobile network, according to one or more embodiments.

FIG. 1 shows an architecture of a Fifth Generation (5G) mobile network 100, according to one or more embodiments. In one or more embodiments, 5G mobile network 100 may include a core mobile network 102 and a Radio Access Network (RAN) 104. In one or more embodiments, core mobile network 102 may include associated services thereof, Internet (e.g., Internet 106) interconnectivity and connectivity to a circuit-switched telephone network 108 (e.g., a Public Switched Telephone Network (PSTN)). In one or more embodiments, RAN 104 may be a component of 5G mobile network 100 that provides connectivity between data processing devices (e.g., mobile devices, computing devices, remote-controlled devices, smart vehicles) and core mobile network 102. FIG. 1 merely shows User Equipment (UE) $150_{1-N}$ (e.g., mobile phones may be referred to as UE $150_{1-N}$) as being provided connectivity with core mobile network 102, according to one or more embodiments.

In one or more embodiments, RAN 104 may include mobile towers and UE $150_{1-N}$ connected thereto. As shown in FIG. 1, in one or more embodiments, each mobile tower may be referred to as a gNodeB (a base station). FIG. 1 shows base stations $110_{1-P}$ (gNodeBs) and end-user UE $150_{1-N}$ associated therewith, according to one or more embodiments. The typical architecture of a 5G mobile network is known to one skilled in the art. Detail discussion thereof may, therefore, be skipped for the sake of convenience and clarity. It is to be understood that RAN 104 may include elements including, but not limited to, other circuitries, electronic components and transceivers.

In one or more embodiments, each UE $150_{1-N}$ may have a Universal Subscriber Identity Module (USIM) installed therein that may have been provisioned by a Mobile Network Operator (MNO) (e.g., any one of MNOs $160_{1-Z}$ in FIG. 1). In one or more embodiments, USIM may typically be a module that stores subscriber-related information and implements security functionalities at an end of a user of UE $150_{1-N}$. In one or more embodiments, MNOs $160_{1-Z}$ may be service providers associated with wireless voice, video and/or data communication for subscribers (e.g., users of UE $150_{1-N}$) thereof.

Figure 2:
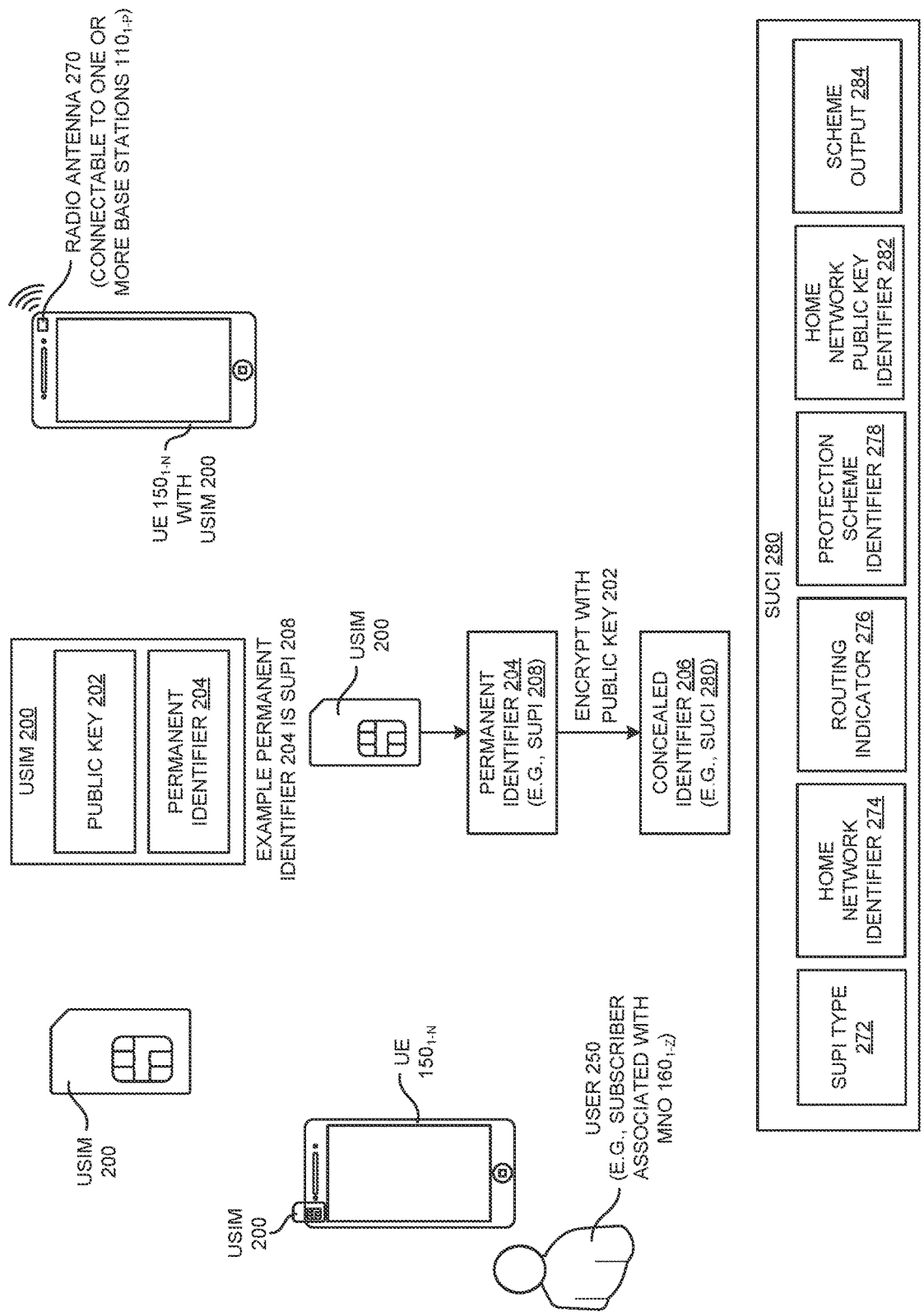
FIG. 2 is a schematic view of a Universal Subscriber Identity Module (USIM) associated with a User Equipment (UE) in the 5G mobile network of FIG. 1, according to one or more embodiments.

FIG. 2 shows a USIM 200 associated with a UE $150_{1-N}$, according to one or more embodiments. In one or more embodiments, USIM 200 may include small-time processing and storage capabilities therein. FIG. 2 shows USIM 200 as including, among other information, a public key 202 of a home network 152 and a permanent identifier 204 of the associated UE $150_{1-N}$. Referring back to FIG. 1, in one or more embodiments, the relevant entities within 5G mobile network 100 with respect to a subscriber (e.g., a user 250, an entity associated with user 250) therein may be UE $150_{1-N}$, home network 152 and a serving network 154. In one or more embodiments, as discussed above, UE $150_{1-N}$ may be a data processing device (e.g., a mobile phone, a remote-controlled device, a smart vehicle) connected to 5G mobile network 100. In one or more embodiments, home network 152 may be a subscriber (e.g., user 250, an entity associated with user 250) network associated with an MNO $160_{1-Z}$ of the subscriber, and serving network 154 may be associated with one or more base station(s) $110_{1-P}$ that UE $150_{1-N}$ of the subscriber connects to. In some embodiments, home network 152 and serving network 154 may be the same, depending on functionalities and/or capabilities of MNO $160_{1-Z}$.

In one or more embodiments, home network 152 may perform the task of authenticating the subscriber (e.g., user 250). In one or more embodiments, home network 152, as discussed herein, may include one or more server(s) within 5G mobile network 100 that stores credentials of user 250 associated with USIM 200/UE $150_{1-N}$ and authenticates said user 250. Referring back to FIGS. 1-2, in one or more embodiments, a radio antenna 270 on UE $150_{1-N}$ may receive system information messages from one or more base stations $110_{1-P}$ within range that inform said UE $150_{1-N}$ of attributes such as priority, frequencies employed and signal strength. In one or more embodiments, UE $150_{1-N}$ may typically connect to a base station $110_{1-P}$ with the strongest signal.

In one or more embodiments, in order to improve security and privacy, a new generation mobile network such as 5G mobile network 100 may modify the way UEs $150_{1-N}$ identify themselves and may have schemes implemented therein to prevent UEs $150_{1-N}$ from being downgraded to a less-secure architecture. In one or more embodiments, the aforementioned changes may make it difficult, or even impossible, to determine an account or an identity behind a UE $150_{1-N}$. In one or more embodiments, as seen above, a prerequisite for a UE $150_{1-N}$ to connect to a network of an MNO $160_{1-Z}$ may be for said UE $150_{1-N}$ to self-identify. In one or more embodiments, the identifier with which UE $150_{1-N}$ self-identifies may then confirm a user (e.g., user 250) associated with UE $150_{1\text{-}N}$ as a valid subscriber with home network 152 discussed above and the associated user profile set.

In previous generation mobile devices, when communicating identity thereof, a UE analogous to UE $150_{1\text{-}N}$ may provide a permanent identifier (e.g., International Mobile Subscriber Identity (IMSI)) in an unencrypted manner. In other words, the identity of the UE may be shared "over the air," When said UE talked to base stations analogous to base stations $110_{1\text{-}P}$, the identity of the UE may have been shared along with other information such as location "over the air." Many systems utilized by MNOs $160_{1\text{-}Z}$ may rely on real-time or near real-time identification information based on cyber security, billing and/or fraud detection. Legally authorized law enforcement investigation, fugitive location and/or tools for victim recovery may also rely on said real-time or near real-time identification information. Criminals, foreign adversaries and/or oppressive regimes in specific nations may also have leveraged said real-time or near real-time information and/or the ability to interface with a UE for nefarious purposes. These may have been some of the reasons why issues of privacy and security have taken center-stage when designing 5G mobile networks, and why the process of how a UE (e.g., UE $150_{1\text{-}N}$) is identified itself may have changed.

Referring back to FIG. 2, in one or more embodiments, USIM 200 in a UE $150_{1\text{-}N}$ may be programmed with a permanent identifier 204 thereof. In one or more embodiments, in 5G mobile network 100, permanent identifier 204 may be called a Subscription Permanent Identifier (SUPI) 208. In one or more embodiments, SUPI 208 may contain either the IMSI discussed above or the Network Access Identifier (NAI) (e.g., used to identify UE $150_{1\text{-}N}$ independent of a current location thereof or Internet Protocol (IP) addresses thereof). In one or more embodiments, any time UE $150_{1\text{-}N}$ may be requested to self-identify to 5G mobile network 100, a public encryption key (e.g., public key 202) of the home network stored in USIM 200 may be utilized to encrypt permanent identifier 204 (e.g., SUPI 208) and, thereby, create a concealed identifier 206 (e.g., a Subscription Concealed Identifier (SUCI) 280), as shown in FIG. 2.

FIG. 2 also shows fields within SUCI 280 (example concealed identifier 206), according to one or more embodiments. In one or more embodiments, said fields may include but are not limited to SUPI type 272, home network identifier 274, routing indicator 276, protection scheme identifier 278, home network public key identifier 282 (e.g., associated with public key 202) and scheme output 284. In one or more embodiments, among these fields within SUCI 280 may be home network identifier 274 that is unencrypted and that which enables SUCI 280 to be transmitted to home network 152 for decryption.

In one or more embodiments, the creation of concealed identifier 206 and, thereby, the concealment of permanent identifier 204 may have one or more impacts. In one or more embodiments, as concealed identifier 206 (e.g., SUCI 280) may be an encrypted version of permanent identifier 204 (e.g., SUPI 208) and encryption may be re-performed each time UE $150_{1\text{-}N}$ self-identifies (e.g., to base stations $110_{1\text{-}P}$), UE $150_{1\text{-}N}$ may never appear the same way twice. For example, the feeder variable that goes into the aforementioned encryption may keep changing over time. Thus, in one or more embodiments, association of UE $150_{1\text{-}N}$ with a user account may be rendered difficult. Also, in one or more embodiments, as determining location of UE $150_{1\text{-}N}$ may involve correlating signal strength (or, return time) readings and applying techniques such as trilateration, said correlation and application of techniques may be prevented by the ever-changing nature of concealed identifier 206 (e.g., SUCI 280).

Referring back to FIG. 1, in one or more embodiments, UE $150_{1\text{-}N}$ may access services within 5G mobile network 100 and/or the Internet via core mobile network 102. In one or more embodiments, core mobile network 102 may include an Access and Mobility Management Function (AMF) module 122 that supports registrations, connections and mobility management and performs access authentication and authorization. Other functionalities pertaining to security may also come under the purview of AMF module 122. In one or more embodiments, AMF module 122 may be an entry point for connections of UE $150_{1\text{-}N}$ to core mobile network 102. In other words, AMF module 122 may access and control mobility of UE $150_{1\text{-}N}$ during roaming thereof between one base station $110_{1\text{-}P}$ to another. In one or more embodiments, core mobile network 102 may also include an Authentication Server Function (AUSF) module 124 that performs the actual authentication of UE $150_{1\text{-}N}$. In other words, in one or more embodiments, AUSF module 124 may receive authentication requests from AMF module 122 and, in conjunction with a Unified Data Management (UDM) module 126, may procure authentication information and validate whether authentication processes are successful or not.

In one or more embodiments, core mobile network 102 may further include UDM module 126 that supports generation of credential, user identification, handling, access authorization and subscription management. As implied above, in one or more embodiments, UDM module 126 may select a method of authentication based on identity of user 250 and policy configured in core mobile network 102 and compute authentication and keying information for AUSF module 124, as will be discussed below. It should be noted that in core mobile network 102, functionalities may be split based on service (e.g., services associated with distinct modules such as AMF module 122, AUSF module 124 and UDM module 126). In accordance therewith, core mobile network 102 may have a Service-Based Architecture (SBA). Also, as seen above, in one or more embodiments, at least a portion of AMF module 122 (e.g., SEAF module 128 discussed below) may come under the purview of serving network 154 and AUSF module 124 and UDM module 126 may come under the purview of home network 152.

Figure 3:
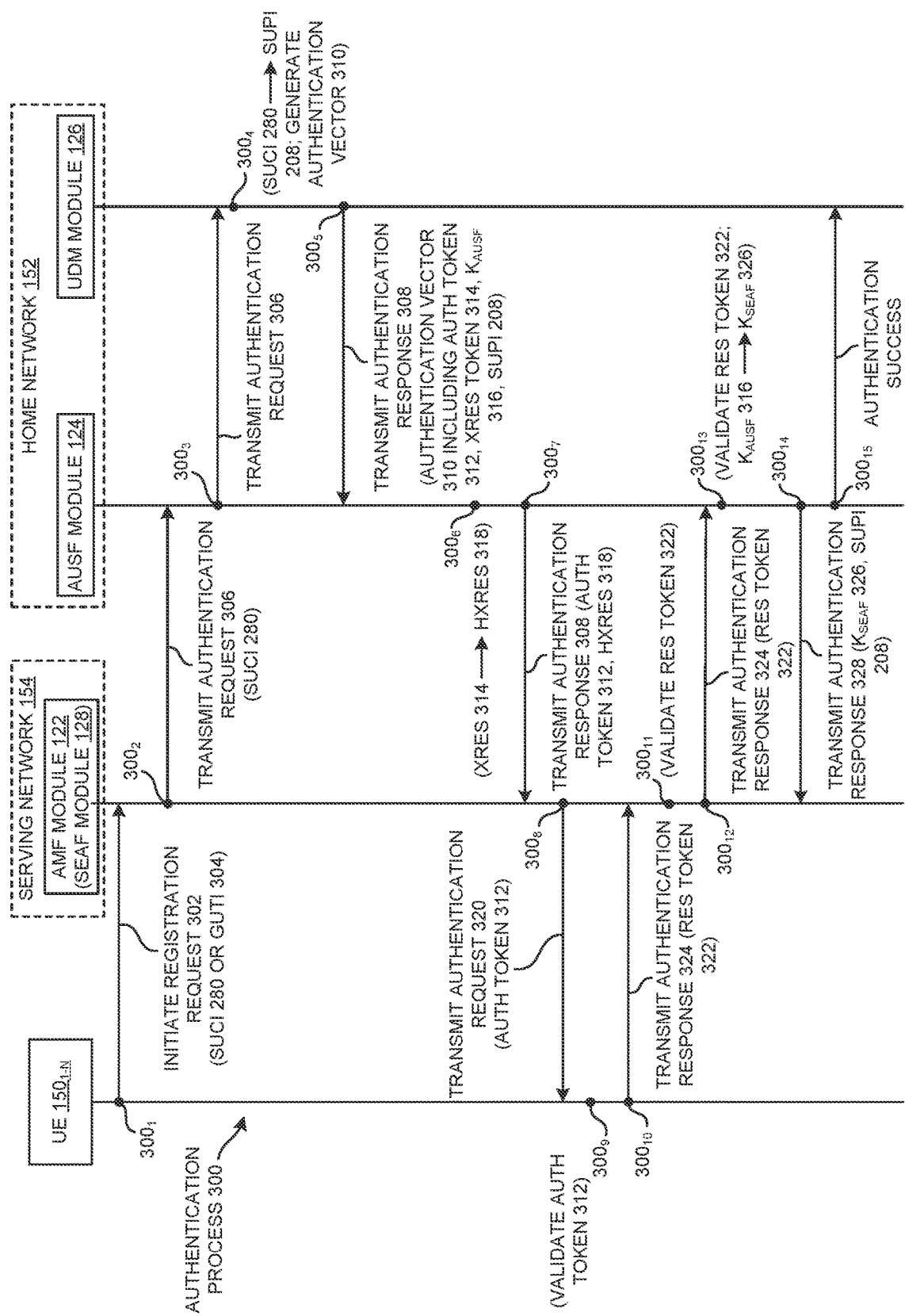
FIG. 3 is a schematic and an illustrative view of an authentication process between the UE of FIGS. 1-2 and a home network thereof via a serving network of the 5G mobile network of FIG. 1, according to one or more embodiments.

FIG. 3 shows an authentication process 300 between a UE $150_{1\text{-}N}$ and home network 152 via serving network 154, according to one or more embodiments. In one or more embodiments, as part of operation $300_1$, authentication process 300 may begin with UE $150_{1\text{-}N}$ initiating a registration request 302 (e.g., network registration request) to AMF module 122. In one or more embodiments, if UE $150_{1\text{-}N}$ has registered with AMF module 122 in the past, UE $150_{1\text{-}N}$ may provide a Globally Unique Temporary Identifier (GUTI) 304 (e.g., previously allocated by AMF module 122) thereto; else, UE $150_{1\text{-}N}$ may provide concealed identifier 206 (e.g., SUCI 280) thereto. In one or more embodiments, in accordance with registration request 302, a Security Anchor Function (SEAF) Module 128 (refer to FIG. 1) that is part of AMF module 122 may transmit an authentication request 306 to AUSF module 124 as part of operation $300_2$. In one or more embodiments, as part of operation $300_3$, AUSF module 124, in turn, may transmit authentication request 306 to UDM module 126.

In one or more embodiments, SEAF module 128 may be in serving network 154 (in contrast to home network 152 discussed above) and may mediate authentication process 300 between UE $150_{1-N}$ and home network 152 thereof. In one or more embodiments, if initially concealed identifier 206 (e.g., SUCI 280) was provided by UE $150_{1-N}$, UDM module 126 may first need to de-conceal concealed identifier 206 (e.g., SUCI 280). In one or more embodiments, this may be performed by a Subscription Identifier De-Concealing Function (SIDF) module 130 (refer to FIG. 1) that is part of UDM module 126 as part of operation $300_4$.

In one or more embodiments, UDM module 126 may then transmit an authentication response 308 to AUSF module 124 as part of operation $300_5$. In one or more embodiments, said authentication response 308 may include an authentication vector 310 including an authorization (AUTH) token 312, an Expected Response (XRES) token 314 and an intermediary key $K_{AUSF}$ 316. In one or more embodiments, $K_{AUSF}$ 316 may be utilized to derive other keys with respect to encryption and authorization. In one or more embodiments, in case UE $150_{1-N}$ provided concealed identifier 206 (e.g., SUCI 280) initially, authentication vector 310 may also include permanent identifier 204 (e.g., SUPI 208) in operation $300_5$.

In one or more embodiments, AUSF module 124 may then compute a hash of XRES token 314 as HXRES 318 and store $K_{AUSF}$ 316 as part of operation $300_6$. In one or more embodiments, AUSF module 124 may then transmit authentication response 308 to AMF module 122 (SEAF module 128) as part of operation $300_7$. In one or more embodiments, this transmitted authentication response 308 may include AUTH token 312 and HXRES 318. In one or more embodiments, AMF module 122 (SEAF module 128) may also store HXRES 318. In one or more embodiments, AMF module 122 (SEAF module 128) may transmit another authentication request 320 to UE $150_{1-N}$ as part of operation $300_8$; authentication request 320 may include AUTH token 312.

In one or more embodiments, UE $150_{1-N}$ may then validate AUTH token 312 (e.g., using a secret, private key stored in USIM 200 shared with home network 152) as part of operation $300_9$. If successful, in one or more embodiments, UE $150_{1-N}$ may consider home network 152 thereof authenticated. Following this, in one or more embodiments, UE $150_{1-N}$ may compute/calculate a resolution (RES) token 322.

In one or more embodiments, UE $150_{1-N}$ may then transmit AMF module 122 (SEAF module 128) another authentication response 324 that includes RES token 322 as part of operation $300_{10}$. In one or more embodiments, AMF module 122 (SEAF module 128) may validate RES token 322 as part of operation $300_{11}$ and transmit authentication response 324 with RES token 322 to AUSF module 124 as part of operation $300_{12}$. In one or more embodiments, AUSF module 124 may, in turn, validate RES token 322 and compute/calculate an anchor key ($K_{SEAF}$) 326 (e.g., from $K_{AUSF}$ 316) as part of operation $300_{13}$. In one or more embodiments, AUSF module 124 may transmit yet another authentication response 328 to AMF module 122 (SEAF module 128) that may include $K_{SEAF}$ 326 as part of operation $300_{14}$. In one or more embodiments, if UE $150_{1-N}$ had provided permanent identifier 204 (e.g., SUPI 208) initially, permanent identifier 204 (e.g., SUPI 208) may be provided in authentication response 328 in operation $300_{14}$. In one or more embodiments, AUSF module 124 may also transmit UDM module 126 a message indicating that the authentication is successful as part of operation $300_{15}$.

It should be noted that, while the numbered operations discussed above and details thereof may vary, the end general result may be the same. Further, it should be noted that the processes associated with handling failures and/or rejections have been skipped for the sake of illustrative convenience and clarity. In order to resolve concealed identifier 206 (e.g., SUCI 280) of a UE $150_{1-N}$ into permanent identifier 204 (e.g., SUPI 208), exemplary embodiments discussed herein may involve transmitting a request to UDM module 126 to de-conceal concealed identifier 206 (e.g., SUCI 280) and return permanent identifier 204 (e.g., SUPI 204). For the aforementioned purpose, in one or more embodiments, a component (e.g., a module) that presents itself and behaves as AUSF module 124 may be introduced into core network architecture 102 (e.g., under the purview of home network 152). In one or more embodiments, as the functionalities of said component may constitute a narrow subset of the functionalities provided by AUSF module 124, the component may be referred to as a "pseudo-AUSF" (as will be discussed below). In one or more embodiments, the "pseudo-AUSF" may be installed with the approval and the cooperation of MNO $160_{1-Z}$ associated with UE $150_{1-N}$.

Figure 4:
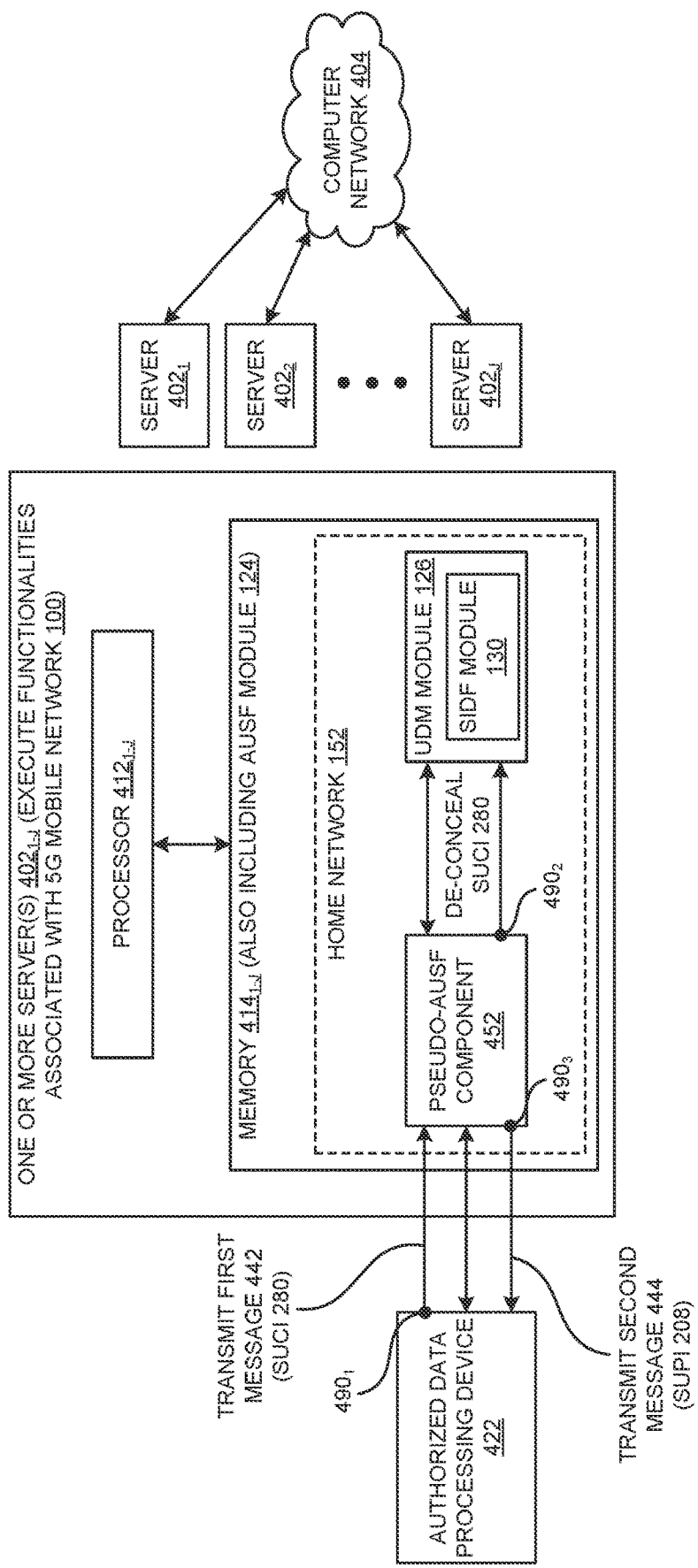
FIG. 4 is a schematic view of one or more server(s) that execute functionalities associated with the 5G mobile network of FIG. 1 including a core mobile network thereof, according to one or more embodiments.

FIG. 4 shows one or more server(s) $402_{1-J}$ that execute functionalities associated with 5G mobile network 100 including core mobile network 102, according to one or more embodiments. In one or more embodiments, servers $402_{1-J}$ may be communicatively coupled to one another through a computer network 404 (e.g., a Wide Area Network (WAN), Internet, other forms of computer/mobile networks). FIG. 4 shows an illustrative server $402_{1-J}$ including a processor $412_{1-J}$ communicatively coupled to a memory $414_{1-J}$ (e.g., a volatile and/or a non-volatile memory). It should be noted that, in some embodiments, processor $412_{1-J}$ may be a network of processors and/or a distributed set of processors, that memory $414_{1-J}$ may include storage and/or database capabilities, and that memory $414_{1-J}$ may be a network/distributed set of memories. While FIG. 4 illustrates functionalities associated with the "pseudo-AUSF" discussed above solely with reference to one server $402_{1-J}$ merely for the sake of convenience and clarity, it should be noted that one or more servers $402_{1-J}$ may perform the aforementioned functionalities and may have the components to be discussed below distributed thereacross.

FIG. 4 shows an authorized data processing device 422 seeking real-time or near real-time resolution of concealed identifier 206 (e.g., SUCI 280) of a UE $150_{1-N}$ into permanent identifier 204 (e.g., SUPI 208) thereof, according to one or more embodiments. As shown in FIG. 4, in one or more embodiments, a pseudo-AUSF component 452 may be implemented in home network 152 represented by server $402_{1-J}$; pseudo-AUSF component 452 is shown as stored in memory $414_{1-J}$ and executable through processor $412_{1-J}$. In one or more embodiments, authorized data processing device 422 may transmit a first message 442 (e.g., as a request) for identity association to pseudo-AUSF component 452 as part of operation $490_1$. In one or more embodiments, first message 442 may include concealed identifier 206 (e.g., SUCI 280) of UE $150_{1-N}$. In one or more embodiments, authorized data processing device 422 and/or UE $150_{1-N}$ may self-identify with concealed identifier 206 (e.g., SUCI 280). In some embodiments, authorized data processing device 422 may be the same as UE $150_{1-N}$.

In one or more embodiments, in accordance with reception of first message 442, pseudo-AUSF component 452 may automatically communicate with UDM module 126 to de-conceal concealed identifier 206 (e.g., SUCI 280) as part of operation $490_2$, and pseudo-AUSF component 452 may automatically provide permanent identifier 204 (e.g., SUPI 208) to authorized data processing device 422 in a second message 444 that may be a response to first message 442 as part of operation $490_3$; this automatic provision of permanent identifier 204 by pseudo-AUSF component 452 may be enabled by the de-concealing of concealed identifier 206 using UDM module 126.

In one or more embodiments, the de-concealing of concealed identifier 206 discussed with reference to FIG. 4 may be similar to the de-concealing of concealed identifier 206 (e.g., SUCI 280) in performed by SIDF module 130 of UDM module 126 as part of operation 300$_4$. In one or more embodiments, operation 490$_3$ in which permanent identifier 204 (e.g., SUPI 208) may be automatically provided to authorized data processing device 422 may be similar to operation 300$_5$ in which permanent identifier (e.g., SUPI 208) is part of authentication vector 310 transmitted as part of authentication response 308. All reasonable variations are within the scope of the exemplary embodiments discussed herein.

Figure 5:
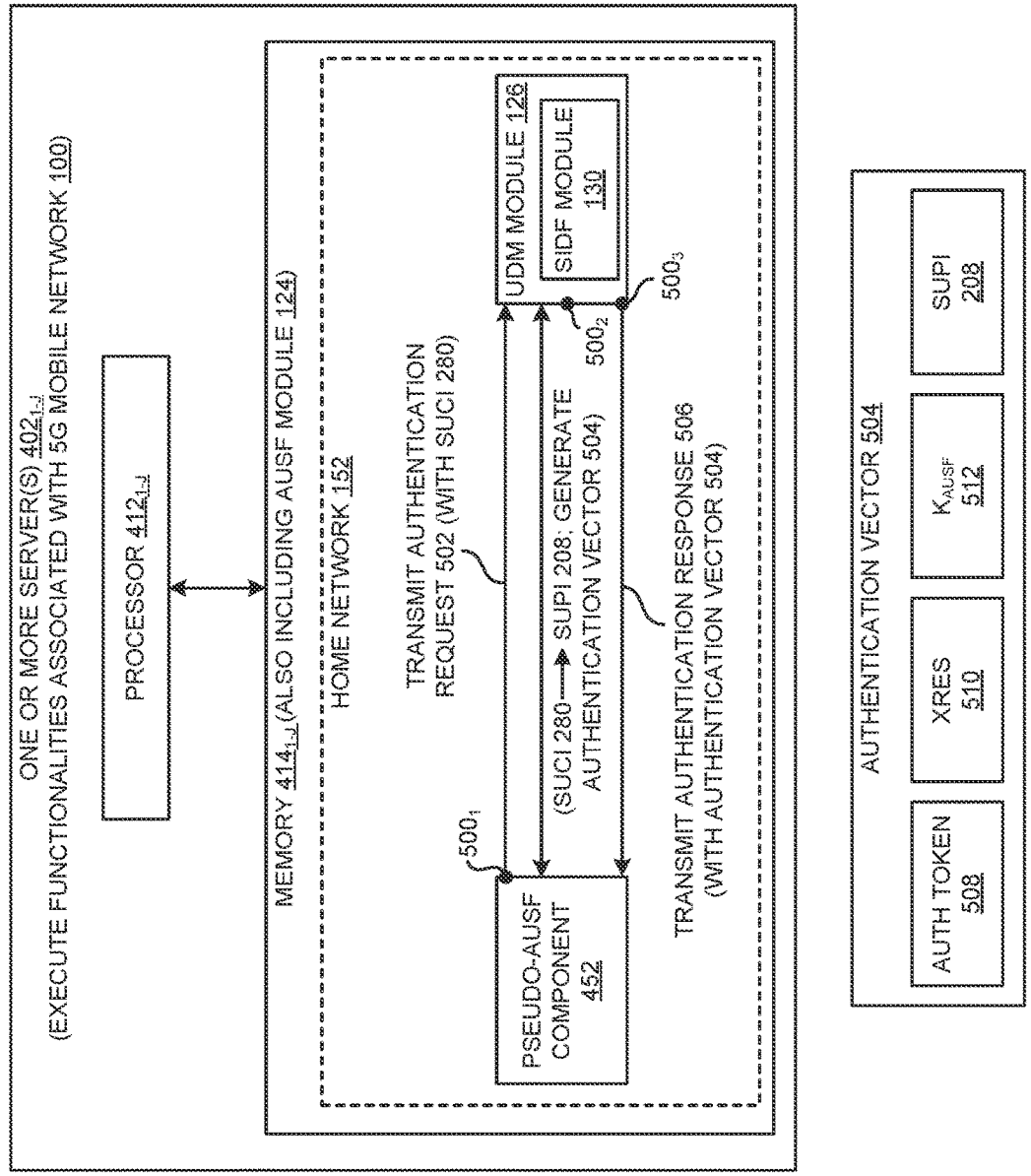
FIG. 5 is a schematic and an illustrative view of communication between a pseudo-Authentication Server Function (AUSF) component of FIG. 4 and a Unified Data Management (UDM) module of FIGS. 1 and 4 for the de-concealing of a concealed identifier of the UE of FIGS. 1-4, according to one or more embodiments.

In one or more embodiments, when pseudo-AUSF component 452 receives first message 442 for identity resolution with respect to authorized data processing device 422, as discussed above with regard to FIG. 4, pseudo-AUSF component 452 may communicate with UDM module 126 using standard 3rd Generation Partnership Project (3GPP) messages. FIG. 5 shows communication between pseudo-AUSF component 452 and UDM module 126 for the de-concealing of concealed identifier 206 (e.g., SUCI 280) discussed with regard to FIG. 4, according to one or more embodiments. In one or more embodiments, when pseudo-AUSF component 452 receives first message 442 (e.g., as a request) for identity resolution, pseudo-AUSF component 452 may automatically transmit a corresponding authentication request 502 (e.g., as a message analogous to authentication request 306) to UDM module 126 (shown stored in memory 414$_{1-J}$) in operation 500$_1$. In one or more embodiments, authentication request 502 may include concealed identifier 206 (e.g., SUCI 280). In one or more embodiments, in operation 500$_2$, UDM module 126 (e.g., SIDF module 130 thereof) may de-conceal concealed identifier 206 (e.g., SUCI 280) and generate an authentication vector 504 (e.g., analogous to authentication vector 310) that includes permanent identifier 204 (e.g., SUPI 208). In one or more embodiments, as part of operation 500$_3$, UDM module 126 may transmit an authentication response 506 (e.g., analogous to authentication response 308) to pseudo-AUSF component 452 as part of addressing authentication request 502; said authentication response 506 may include authentication vector 504 that, in turn, may include a set of data analogous to AUTH token 312, an XRES token 314 and intermediary key K$_{AUSF}$ 316 in addition to SUPI 208. FIG. 5 shows this set of data as AUTH token 508, XRES 510 and K$_{AUSF}$ 512. All reasonable variations are within the scope of the exemplary embodiments discussed herein.

Thus, exemplary embodiments enable the determination of permanent identifier 204 (e.g., SUPI 208) of a UE 150$_{1-N}$ connected to core mobile network 102 of 5G mobile network 100. In one or more embodiments, through the presentation of pseudo-AUSF component 452 (e.g., legally and with knowledge of MNO 160$_{1-Z}$) as a component of core mobile network 102 distinct from a pre-existing AUSF module 124 thereof, existing standard messaging may be leveraged to obtain permanent identifier 204 of UE 150$_{1-N}$ based on concealed identifier 206 (e.g., SUCI 280).

Figure 6:
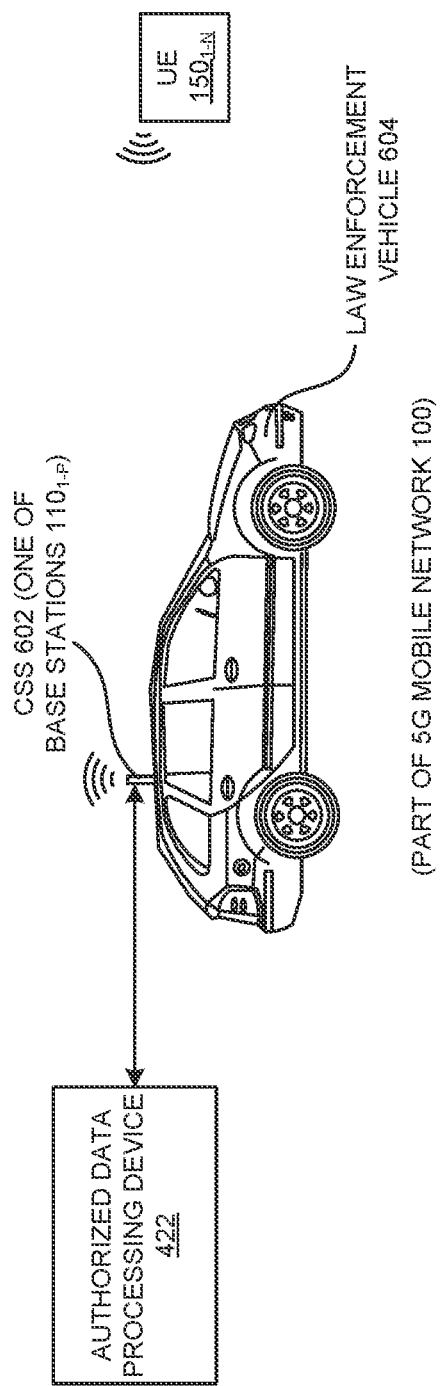
FIG. 6 is a schematic view of a Cell-Site Simulator (CSS) implemented on a law enforcement vehicle, according to one or more embodiments.

Example applications may involve implementing pseudo-AUSF component 452 in conjunction with a Cell-Site Simulator (CSS). FIG. 6 shows a CSS 602 implemented on a law enforcement vehicle 604, according to one or more embodiments. In one or more embodiments, with the cooperation of MNO 160$_{1-Z}$ associated with a UE 150$_{1-N}$, CSS 602 may be installed to enable UE 150$_{1-N}$ (or, a set of UE 150$_{1-N}$) to connect to CSS 602. In one or more embodiments, as CSS 602 may mimic a mobile tower and may broadcast a signal that is stronger than those from base stations 110$_{1-P}$ within a geographical location of UE 150$_{1-N}$, UE 150$_{1-N}$ may automatically connect to CSS 602. In some embodiments, CSS 602 may be regarded as a base station 110$_{1-P}$. Now, in one or more embodiments, authorized data processing device 422 (e.g., UE 150$_{1-N}$, an device external to UE 150$_{1-N}$) may self-identify to CSS 602 (e.g., part of 5G mobile network 100) with concealed identifier 206 (e.g., SUCI 280). In one or more embodiments, first message 442 discussed above with regard to FIG. 4 may be automatically routed to pseudo-AUSF component 452 presenting itself as a component of core mobile network 102. The process of procuring permanent identifier 204 (e.g., SUPI 208) from concealed identifier 206 (e.g., SUCI 280) may be similar to the discussions relevant to FIGS. 4-5. Concepts discussed herein may enable authorized entities to zero in on illegal activities within a geographical location and/or locate people within the geographical location. Further, signal strength, locational proximity and/or direction of specific UE 150$_{1-N}$ may be obtained based on connection thereof to CSS 602. All reasonable variations are within the scope of the exemplary embodiments discussed herein.

Figure 7:
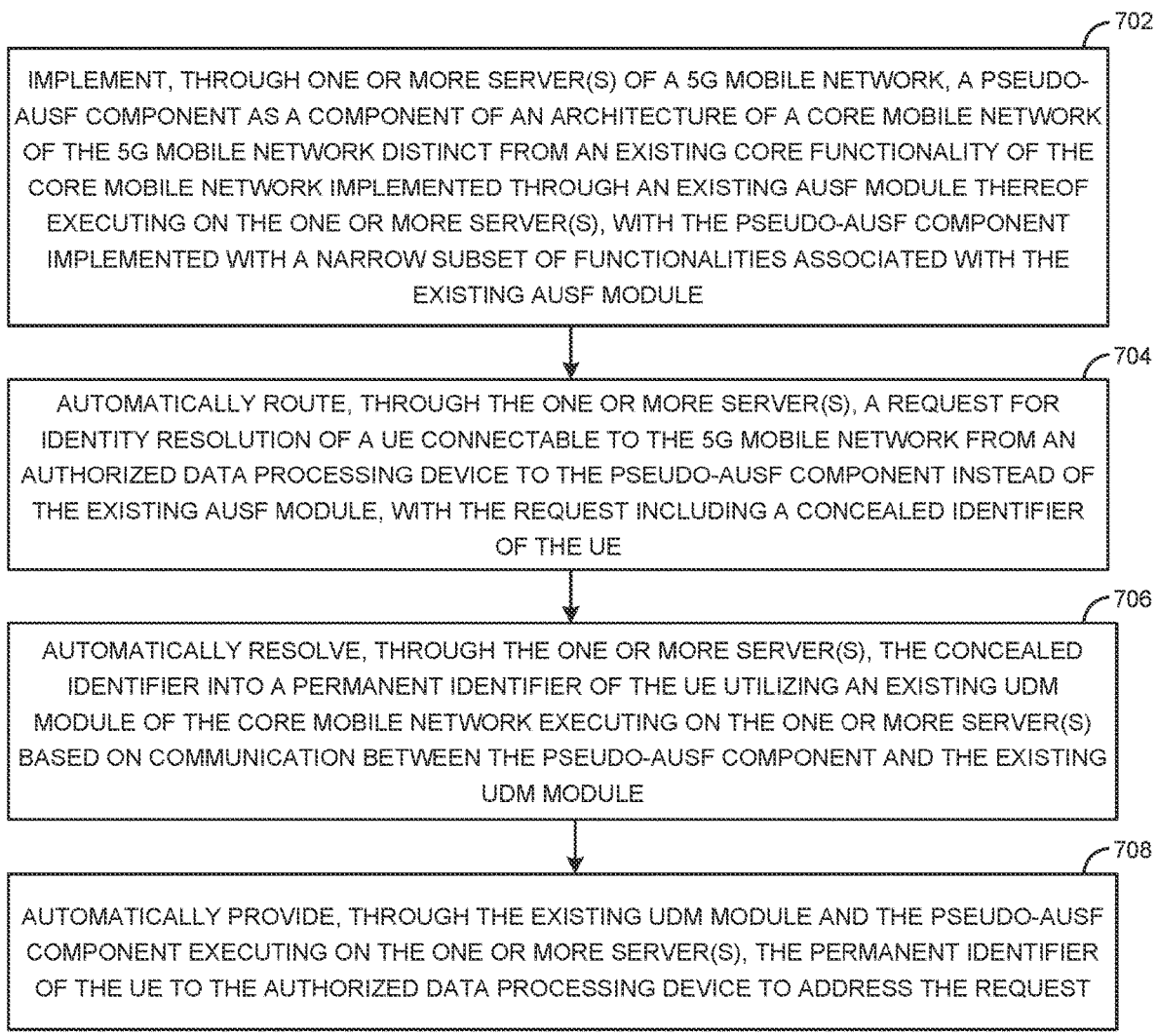
FIG. 7 is a process flow diagram detailing the operations involved in identity resolution of a UE connectable to a 5G mobile network, according to one or more embodiments.

FIG. 7 shows a process flow diagram detailing the operations involved in identity resolution of a UE (e.g., UE 150$_{1-N}$) connectable to a 5G mobile network (e.g., 5G mobile network 100), according to one or more embodiments. In one or more embodiments, operation 702 may involve implementing, through one or more server(s) (e.g., server(s) 402$_{1-J}$) of the 5G mobile network including one or more processor(s) (e.g., processor 412$_{1-J}$) communicatively coupled to one or more memories (e.g., memory 414$_{1-J}$), a pseudo-AUSF component (e.g., pseudo-AUSF component 452) as a component of an architecture of a core mobile network (e.g., core mobile network 102) of the 5G mobile network distinct from an existing core functionality of the core mobile network implemented through an existing AUSF module (e.g., AUSF module 124) thereof executing on the one or more server(s). In one or more embodiments, the pseudo-AUSF component may be implemented with a narrow subset of functionalities associated with the existing AUSF module.

In one or more embodiments, operation 704 may involve automatically routing, through the one or more server(s), a request (e.g., first message 442) for identity resolution of the UE connectable to the 5G mobile network from an authorized data processing device (e.g., authorized data processing device 422) to the pseudo-AUSF component instead of the existing AUSF module, with the request including a concealed identifier (e.g., concealed identifier 206, SUCI 280) of the UE. In one or more embodiments, operation 706 may involve automatically resolving, through the one or more server(s), the concealed identifier into a permanent identifier (e.g., permanent identifier 204, SUPI 208) of the UE utilizing an existing UDM module (e.g., UDM module 126) of the core mobile network executing on the one or more server(s) based on communication between the pseudo-AUSF component and the existing UDM module.

In one or more embodiments, operation 708 may then involve automatically providing, through the existing UDM module and the pseudo-AUSF component executing on the one or more server(s), the permanent identifier of the UE to the authorized data processing device to address the request.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., 5G mobile network 100, core mobile network 102), and may be performed in any order (e.g., including using means for achieving the various operations). Accordingly, the specification and drawings are to be regarded in an illustrative rather than a restrictive sense.

What is claimed is:

1. A method comprising:
   implementing, through at least one server of a Fifth Generation (5G) mobile network comprising at least one processor communicatively coupled to at least one memory, a pseudo-Authentication Server Function (AUSF) component as a component of an architecture of a core mobile network of the 5G mobile network distinct from an existing core functionality of the core mobile network implemented through an existing AUSF module thereof executing on the at least one server, the pseudo-AUSF component implemented with a narrow subset of functionalities associated with the existing AUSF module;
   automatically routing, through the at least one server, a request for identity resolution of a User Equipment (UE) connectable to the 5G mobile network from an authorized data processing device to the pseudo-AUSF component instead of the existing AUSF module, the request comprising a concealed identifier of the UE;
   implementing a Cell-Site Simulator (CSS) within a geographical location covered by the 5G mobile network;
   enabling, through the at least one server, at least one of: the authorized data processing device and the UE to self-identify to the CSS with the concealed identifier in the request prior to the request being automatically routed to the pseudo-AUSF component;
   automatically resolving, through the at least one server, the concealed identifier into a permanent identifier of the UE utilizing an existing Unified Data Management (UDM) module of the core mobile network executing on the at least one server based on communication between the pseudo-AUSF component and the existing UDM module; and
   automatically providing, through the existing UDM module and the pseudo-AUSF component executing on the at least one server, the permanent identifier of the UE to the authorized data processing device to address the request.

2. The method of claim 1, further comprising automatically transmitting, through the pseudo-AUSF component, an authentication request to the existing UDM module following the automatic routing of the request for the identity resolution of the UE to the pseudo-AUSF component, the authentication request comprising the concealed identifier.

3. The method of claim 1, comprising at least one of:
   the concealed identifier being a Subscription Concealed Identifier (SUCI) of the UE; and
   the permanent identifier being a Subscription Permanent Identifier (SUPI) of the UE.

4. The method of claim 1, comprising the UE being at least one of: a mobile device, a computing device, a remote-controlled device and a smart vehicle.

5. The method of claim 1, further comprising implementing the pseudo-AUSF component in conjunction with a Mobile Network Operation (MNO) of the 5G mobile network associated with the UE.

6. The method of claim 2, further comprising:
   de-concealing, through an existing Subscription Identifier De-Concealing Function (SIDF) module of the existing UDM module executing on the at least one server, the concealed identifier as part of automatically resolving the concealed identifier into the permanent identifier.

7. The method of claim 6, further comprising generating, through the existing UDM module, an authentication vector comprising the permanent identifier to be provided to the pseudo-AUSF component as part of addressing the authentication request.

8. A server comprising:
   a memory comprising a pseudo-AUSF component stored therein implemented with a narrow subset of functionalities associated with an existing AUSF module of a core mobile network of a 5G mobile network executing on the server; and
   a processor communicatively coupled to the memory, the processor executing instructions to:
      implement the pseudo-AUSF component as a component of an architecture of the core mobile network distinct from an existing core functionality of the core mobile network implemented through the existing AUSF module,
      automatically route a request for identity resolution of a UE connectable to the 5G mobile network from an authorized data processing device to the pseudo-AUSF component instead of the existing AUSF module, the request comprising a concealed identifier of the UE,
      implement a CSS within a geographical location covered by the 5G mobile network,
      enable at least one of: the authorized data processing device and the UE to self-identify to the CSS with the concealed identifier in the request prior to the request being automatically routed to the pseudo-AUSF component,
      automatically resolve the concealed identifier into a permanent identifier of the UE utilizing an existing UDM module of the core mobile network executing on the server based on communication between the pseudo-AUSF component and the existing UDM module, and
      automatically provide, through the existing UDM module and the pseudo-AUSF component, the permanent identifier of the UE to the authorized data processing device to address the request.

9. The server of claim 8, wherein the processor further executes instructions to automatically transmit, through the pseudo-AUSF component, an authentication request to the existing UDM module following the automatic routing of the request for the identity resolution of the UE to the pseudo-AUSF component, the authentication request comprising the concealed identifier.

10. The server of claim 8, wherein the server is at least one of: a network of servers and a distributed set of servers.

11. The server of claim 8, wherein the pseudo-AUSF component is implemented in conjunction with an MNO of the 5G mobile network associated with the UE.

12. The server of claim 9, wherein the processor further executes instructions to:
de-conceal, through an existing SIDF module of the existing UDM module executing on the server, the concealed identifier as part of automatically resolving the concealed identifier into the permanent identifier.

13. The server of claim 12, wherein the processor further executes instructions to generate, through the existing UDM module, an authentication vector comprising the permanent identifier to be provided to the pseudo-AUSF component as part of addressing the authentication request.

14. A system comprising:
an authorized data processing device originating a request for identity resolution of a UE connectable to a 5G mobile network, the request comprising a concealed identifier of the UE; and
at least one server comprising at least one processor communicatively coupled to at least one memory implementing a pseudo-AUSF component as a component of an architecture of a core mobile network of the 5G mobile network distinct from an existing core functionality of the core mobile network implemented through an existing AUSF module thereof executing on the at least one server, the pseudo-AUSF component implemented with a narrow subset of functionalities associated with the existing AUSF module,
wherein the at least one server;
automatically routes the request from the authorized data processing device to the pseudo-AUSF component instead of the existing AUSF module,
implements a CSS within a geographical location covered by the 5G mobile network,
enables at least one of: the authorized data processing device and the UE to self-identify to the CSS with the concealed identifier in the request prior to the request being automatically routed to the pseudo-AUSF component,
automatically resolves the concealed identifier into a permanent identifier of the UE utilizing an existing UDM module of the core mobile network executing on the at least one server based on communication between the pseudo-AUSF component and the existing UDM module, and
automatically provides, through the existing UDM module and the pseudo-AUSF component, the permanent identifier of the UE to the authorized data processing device to address the request.

15. The system of claim 14, wherein the at least one server further automatically transmits, through the pseudo-AUSF component, an authentication request to the existing UDM module following the automatic routing of the request for the identity resolution of the UE to the pseudo-AUSF component the authentication request comprising the concealed identifier.

16. The system of claim 14, wherein at least one of:
the concealed identifier is a SUCI of the UE, and
the permanent identifier is a SUPI of the UE.

17. The system of claim 14, wherein the UE is at least one of: a mobile device, a computing device, a remote-controlled device and a smart vehicle.

18. The system of claim 14, wherein the at least one server implements the pseudo-AUSF component in conjunction with a MNO of the 5G mobile network associated with the UE.

19. The system of claim 15, wherein the at least one server further:
de-conceals, through an existing SIDF module of the existing UDM module, the concealed identifier as part of automatically resolving the concealed identifier into the permanent identifier.

20. The system of claim 19, wherein the at least one server further generates, through the existing UDM module, an authentication vector comprising the permanent identifier to be provided to the pseudo-AUSF component as part of addressing the authentication request.

* * * * *